(12) United States Patent
Kaczmarz et al.

(10) Patent No.: US 8,742,889 B2
(45) Date of Patent: Jun. 3, 2014

(54) APPARATUS AND METHOD FOR ELECTRONIC ACCESS CONTROL

(75) Inventors: Kenneth A. Kaczmarz, LaGrange Park, IL (US); John B. Payson, Morris, IL (US); John A. Garlisch, Keeneyville, IL (US); Brock E. Robinson, Crest Hill, IL (US); Jesse Mavromatis, Palatine, IL (US); Mitchell S. Mlynarczyk, Hoffman Estates, IL (US)

(73) Assignee: CompX International Inc., Greenville, SC (US)

( * ) Notice: Subject to any disclaimer, the term of this patent is extended or adjusted under 35 U.S.C. 154(b) by 918 days.

(21) Appl. No.: 12/888,510

(22) Filed: Sep. 23, 2010

(65) Prior Publication Data

US 2011/0074543 A1 Mar. 31, 2011

Related U.S. Application Data

(60) Provisional application No. 61/246,602, filed on Sep. 29, 2009.

(51) Int. Cl.
*B60R 25/00* (2013.01)
*G05B 19/00* (2006.01)
*G08B 21/00* (2006.01)
*G06F 19/00* (2011.01)
*G06K 5/00* (2006.01)
*E04H 1/00* (2006.01)
*E06B 7/00* (2006.01)

(52) U.S. Cl.
USPC ......... 340/5.73; 340/5.74; 340/5.6; 340/5.81; 340/689; 340/545.1; 235/385; 235/382; 52/79.1; 52/143; 49/68

(58) Field of Classification Search
USPC ....................... 340/5.73, 574, 5.81
See application file for complete search history.

(56) References Cited

U.S. PATENT DOCUMENTS

| | | | |
|---|---|---|---|
| 3,504,511 A | 4/1970 | Allen |
| 3,666,342 A | 5/1972 | Biesecker |
| 3,792,391 A | 2/1974 | Ewing |
| 3,804,441 A | 4/1974 | Kobayashi et al. |
| 3,917,330 A | 11/1975 | Quantz |
| 4,017,107 A | 4/1977 | Hanchett |
| 4,026,589 A | 5/1977 | Hanchett, Jr. |
| 4,262,830 A | 4/1981 | Haves |
| 4,268,076 A | 5/1981 | Itoi |
| 4,390,197 A | 6/1983 | Butts |
| 4,595,220 A | 6/1986 | Hanchett, Jr. et al. |
| 4,623,178 A | 11/1986 | Geringer et al. |
| 4,626,010 A | 12/1986 | Hanchett, Jr. et al. |
| 4,648,036 A | 3/1987 | Gallant |
| 4,667,990 A | 5/1987 | Quantz |
| 4,667,991 A | 5/1987 | Pèbre |

(Continued)

*Primary Examiner* — Fekadeselassie Girma
(74) *Attorney, Agent, or Firm* — Dority & Manning, P.A.

(57) ABSTRACT

Apparatus and methodology for providing electronic access control are disclosed. In an exemplary configuration, a retro-fittable electronic lock can be used to provide secure storage to an enclosure. A user interface and LCD visual display can be provided to permit convenient adjustment of system operational parameters. In certain embodiments, the electronic access control system includes master-slave control capabilities. In other embodiments, the electronic access control system includes inventory management capability. In still other embodiments, apparatus and methodologies provide the secure storage of the enclosure when the enclosure is being moved or otherwise transported from one location to another location. Various alternative arrangements may provide various alert features, as well as battery features which facilitate rapid replacement and/or reconfiguration.

21 Claims, 8 Drawing Sheets

(56) References Cited

U.S. PATENT DOCUMENTS

| | | | |
|---|---|---|---|
| 4,748,833 | A | 6/1988 | Nagasawa |
| 4,901,545 | A | 2/1990 | Bacon et al. |
| 4,956,984 | A | 9/1990 | Chi-Cheng |
| 4,967,577 | A | 11/1990 | Gartner et al. |
| 5,007,261 | A | 4/1991 | Quantz |
| 5,020,345 | A | 6/1991 | Gartner et al. |
| 5,033,282 | A | 7/1991 | Gartner et al. |
| 5,134,870 | A | 8/1992 | Uyeda et al. |
| 5,142,890 | A | 9/1992 | Uyeda et al. |
| 5,307,656 | A | 5/1994 | Gartner et al. |
| 5,474,348 | A | 12/1995 | Palmer et al. |
| 5,484,180 | A | 1/1996 | Helmar |
| 5,540,068 | A | 7/1996 | Gartner et al. |
| 5,617,082 | A | 4/1997 | Denison et al. |
| 5,690,373 | A | 11/1997 | Luker |
| 5,769,011 | A * | 6/1998 | Daniel ............... 109/7 |
| 5,806,355 | A | 9/1998 | Lanigan et al. |
| 5,876,073 | A | 3/1999 | Geringer et al. |
| 5,927,772 | A | 7/1999 | Antonucci et al. |
| 5,934,720 | A | 8/1999 | Karalius |
| 6,021,038 | A | 2/2000 | Hanchett, Jr. |
| 6,089,058 | A | 7/2000 | Elpern et al. |
| 6,089,626 | A | 7/2000 | Shoemaker |
| 6,092,846 | A | 7/2000 | Fuss et al. |
| 6,108,188 | A | 8/2000 | Denison et al. |
| 6,125,670 | A | 10/2000 | Fuss et al. |
| 6,133,842 | A * | 10/2000 | Gariepy ............... 340/689 |
| 6,209,367 | B1 | 4/2001 | Hyatt et al. |
| 6,359,547 | B1 | 3/2002 | Denison et al. |
| 6,384,711 | B1 * | 5/2002 | Cregger et al. ............ 340/5.65 |
| 6,390,520 | B1 | 5/2002 | Holzer |
| 6,655,180 | B2 | 12/2003 | Gokcebay et al. |
| 6,708,538 | B1 | 3/2004 | Walby |
| 6,730,867 | B2 | 5/2004 | Hyp |
| 6,791,450 | B2 | 9/2004 | Gokcebay et al. |
| 6,886,869 | B2 | 5/2005 | Martinez et al. |
| 6,950,944 | B2 | 9/2005 | Yager et al. |
| 7,004,517 | B2 | 2/2006 | Vitry et al. |
| 7,021,684 | B2 | 4/2006 | Orbeta et al. |
| D520,340 | S | 5/2006 | Freck |
| 7,131,673 | B2 | 11/2006 | Cherry et al. |
| 7,296,830 | B2 | 11/2007 | Koveal et al. |
| 7,336,150 | B2 | 2/2008 | Gokcebay et al. |
| 7,455,335 | B2 | 11/2008 | Garneau et al. |
| 7,456,725 | B2 | 11/2008 | Denison et al. |
| 7,469,564 | B1 | 12/2008 | Shaw |
| 7,472,934 | B2 | 1/2009 | Burke et al. |
| 7,482,907 | B2 | 1/2009 | Denison et al. |
| 7,516,632 | B2 | 4/2009 | Poppell |
| 7,516,633 | B1 | 4/2009 | Chang |
| 7,603,882 | B2 | 10/2009 | Carbajal et al. |
| 7,683,758 | B2 | 3/2010 | Denison et al. |
| 7,728,711 | B2 | 6/2010 | Shoenfeld |
| 7,741,952 | B2 | 6/2010 | Denison et al. |
| 7,768,378 | B2 | 8/2010 | Hill et al. |
| 8,047,582 | B1 | 11/2011 | Rodgers et al. |
| 8,104,803 | B2 | 1/2012 | Horton et al. |
| 8,207,858 | B2 * | 6/2012 | Knopf et al. ............ 340/573.1 |
| 8,490,443 | B2 | 7/2013 | Gokcebay |
| 8,495,898 | B2 | 7/2013 | Gokcebay |
| 2003/0024288 | A1 | 2/2003 | Gokcebay et al. |
| 2004/0032131 | A1 | 2/2004 | Cherry |
| 2004/0084526 | A1 * | 5/2004 | Knowles et al. ............ 235/385 |
| 2005/0179517 | A1 | 8/2005 | Harms et al. |
| 2005/0199026 | A1 | 9/2005 | Geringer et al. |
| 2005/0225097 | A1 | 10/2005 | Geringer et al. |
| 2006/0097522 | A1 | 5/2006 | Denison et al. |
| 2006/0097525 | A1 | 5/2006 | Toma et al. |
| 2006/0150694 | A1 | 7/2006 | Frolov et al. |
| 2006/0186678 | A1 | 8/2006 | Myers et al. |
| 2007/0018791 | A1 | 1/2007 | Johnson et al. |
| 2007/0046040 | A1 | 3/2007 | Chang |
| 2007/0169525 | A1 | 7/2007 | Chang |
| 2007/0245784 | A1 | 10/2007 | Geringer et al. |
| 2007/0277571 | A1 | 12/2007 | Gokcebay |
| 2008/0169657 | A1 | 7/2008 | Horton et al. |
| 2008/0224481 | A1 | 9/2008 | Geringer et al. |
| 2008/0246286 | A1 | 10/2008 | Ostrowski |
| 2008/0252083 | A1 | 10/2008 | Carabalona |
| 2008/0293019 | A1 * | 11/2008 | Dooley et al. ............ 434/107 |
| 2009/0102415 | A1 * | 4/2009 | Muchow et al. ............ 320/101 |
| 2009/0132090 | A1 | 5/2009 | Kaczmarz et al. |
| 2009/0282879 | A1 | 11/2009 | Marcelle et al. |
| 2010/0033329 | A1 * | 2/2010 | Davis et al. ............ 340/571 |
| 2010/0141381 | A1 | 6/2010 | Bliding et al. |

* cited by examiner

Electronic Lock

APPARATUS AND METHOD FOR ELECTRONIC ACCESS CONTROL

PRIORITY CLAIM

This application claims the benefit of previously filed U.S. Provisional Patent Application entitled "APPARATUS AND METHOD FOR ELECTRONIC ACCESS CONTROL," assigned U.S. Ser. No. 61/246,602, filed Sep. 29, 2009, and which is incorporated herein by reference for all purposes.

FIELD OF THE INVENTION

The present subject matter generally relates to lock or access control systems, and more particularly to electronically controlled lock systems such as may be applied to various storage enclosures or cabinets to provide secure storage of various items, equipment, materials, and/or information within the enclosures or cabinets. More specifically, certain present aspects may relate to master-slave control for a plurality of electronic locks used in an electronic access control system, to inventory management using electronic locks, and/or to electronic locks with various features including LCD display screens, motion sensor controls, and alert capabilities.

BACKGROUND OF THE INVENTION

Many occasions arise that require or make desirable access control of different cabinets, entryway doors, carts, tool boxes, and/or other types of boxes, hereafter (regardless generally of their compositions, materials, or configurations) collectively referred to as a cabinet or an enclosure. Such cabinets or enclosures may be provided with doors and/or may also include drawers or similar access areas or ports.

In general, electronic lock systems used to provide electronic access control to enclosures are known. Such electronic lock systems typically may include one or more electronic locks that include a credential reader, a control circuit, and an electronically controlled lock mechanism that can be used to lock or unlock the enclosure in response to a control signal from the control circuit. Such electronic locks can include a plurality of features, including, for example, audit trail data tracking capabilities, temperature monitoring capabilities, and networking capabilities.

In a number of typical instances, the electronic access control system may include a plurality of electronic locks networked together for providing secure storage for many different enclosures, or for different individual doors and drawers, etc. in such enclosures. For instance, a medical cart may include a plurality of doors each secured by an individual electronic lock. It can be desirable to unlock a plurality of such electronic locks at once to allow access to multiple items in the medical cart.

In addition, there is often a need to store and track individual items or particular types of items stored in a cabinet or enclosure. One such circumstance relates to the field of controlled medications (i.e., medicinal products) and, in particular, narcotics (i.e., controlled substances) as may be administered to patients in a medical facility. Another application may be in the storage of tools or other parts in enclosures. In such instances, it may be desirable to maintain inventory data at the electronic lock as to the status of individual items or particular types of items stored accessed in a cabinet or enclosure.

Moreover, in certain circumstances, electronic locks are used to secure mobile enclosures. When such mobile enclosures are being moved from one location to another, an unsecured door or drawer located in the enclosure may come open, causing the contents of the drawer to spill out of the drawer or enclosure or causing injury. Thus, there is a need for an electronic access control system that automatically provides secure storage for an enclosure while the enclosure is being transported.

Additionally, there can also be a need to sense a variety of undesirable conditions for the various components of the electronic access control system, such as, for example, low battery conditions, unauthorized entry conditions, or failure to check in or communicate over the network conditions. It can be desirable to send alerts of such undesirable conditions to users or supervisors so that the conditions can be remedied or otherwise addressed.

U.S. Pat. No. 7,768,378 discloses apparatus and methodology for providing a retrofittable lock assembly. The retrofittable lock contains electronic circuitry that maintains a record of user identification, date, and time of access of users seeking access to items stored in the enclosure.

U.S. Patent Application Publication No. 2009/0132090 discloses apparatus and methodology for temperature monitoring and controlled access to refrigerated medications. An electronically controlled lock is installed on a refrigerator used for storage of temperature sensitive medications. Lock access is given to individuals having differing levels of access authorization so that user level authorization holders may have access to stored medications.

The foregoing patent related publications, all commonly owned with the subject application, are hereby fully incorporated by reference herein for all purposes.

While various implementations of electronic access control systems including one or more electronic locks have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodology are presently disclosed for electronic lock based access control systems. It is to be understood that the present subject matter equally encompasses both apparatus and methodology.

In an exemplary configuration, a retrofittable electronic lock that can be used to provide secure storage to an enclosure has been provided.

In one of its simpler forms, a user interface and LCD visual display are provided to permit convenient adjustment of system operational parameters.

In accordance with aspects of certain embodiments of the present subject matter, the electronic access control system includes master-slave control capabilities such that one or more slave electronic locks are controlled from at least one master electronic lock.

In accordance with yet further aspects of certain embodiments of the present subject matter, methodologies are provided for inventory control at the individual electronic locks. Such inventory control can be uploaded to a central database or other repository over a network.

In accordance with yet additional aspects of certain embodiments of the present subject matter, a self-contained battery pack is provided in which a battery charger is integral with the battery pack to allow for the efficient upgrade to different battery sizes and recharge technologies.

In accordance with yet additional aspects of certain embodiments of the present subject matter, methodologies provide secure storage of the enclosure when the enclosure is being moved or otherwise transported.

In accordance with yet additional aspects of certain embodiments of the present subject matter, methodologies are provided for sending email, facsimile, SMS text or other suitable alerts to various users or other individuals when any of a variety of undesirable conditions are detected by the electronic access control system.

It is to be understood that the present subject matter equally relates to both apparatus (system) subject matter and corresponding and/or associated methodology. One example of a present embodiment relates to an electronic access control system for use with an enclosure of the type having at least an exterior portion and a securable interior portion. Such system preferably comprises a microprocessor based access control circuit; a lock configured to be unlocked by such access control circuit; memory for storage of data associated with contents of an associated enclosure; and a user interface. Such user interface is preferably configured to provide a user access to such access control circuit through input data verified by such microprocessor, wherein such access control circuit is configured to unlock such lock based on input data verified by such microprocessor, and wherein such user interface is further configured to provide a user access to such memory for selective updating of data in such memory regarding contents of the associated enclosure. Through such system and functional arrangement, inventory management is provided relative to the associated enclosure.

In various of the foregoing exemplary systems, such user interface may be configured for input of preprogrammed codes for updating of data in such memory, for coded tracking of stored contents in an enclosure; and such system may further include a communications module for uploading of inventory data to a central server over a network.

In other present alternative arrangements, a plurality of such exemplary systems may be respectively associated with a plurality of securable enclosures, each of which communicates with a central server over an associated network, for uploading of inventory data to such central server, and for downloading operational data to each microprocessor based access control circuit. Further alternatively, selected of such systems may comprise master level systems which are associated with a plurality of other systems comprising slave level systems thereunder, with such communications modules respectively communicating operational data to each slaved microprocessor based access control system from its associated master level system.

In some present alternatives, exemplary electronic access control systems may further include a battery-operated power supply for supplying power to such system.

In other present alternative embodiments, a plurality of present systems may be respectively associated with a plurality of securable enclosures; and a plurality of communications modules may be respectively associated with each such system. Preferably, in such exemplary alternatives, selected of such systems may comprise master level systems which are associated with a plurality of other systems comprising slave level systems thereunder, with such communications modules respectively communicating operational data to each slaved microprocessor based access control system from its associated master level system.

In some other present alternatives of present electronic access control systems, a motion sensor may be associated with such access control circuit and its associated securable enclosure, for sensing movement of such securable enclosure; and the associated user interface may be further configured to override such user access to such access control circuit and to lock such lock whenever such motion sensor senses movement of such securable enclosure. Advantageously, in such matter contents of the associated securable enclosure are safeguarded during any movement of such securable enclosure.

In yet other present alternatives, a plurality of present electronic access control systems may be respectively associated with a plurality of securable enclosures; a plurality of communications modules may be respectively associated with each such system; and a plurality of motion sensors may be respectively associated with each such access control circuit and its associated securable enclosure, for sensing movement of such securable enclosure. Preferably, selected of such systems may comprise master level systems which are associated with a plurality of other systems comprising slave level systems thereunder, with such communications modules respectively communicating operational data to each slaved microprocessor based access control system from its associated master level system. Still further, each such user interface may be further configured to override such user access to such access control circuit and to lock such lock whenever its associated motion sensor senses movement of its associated securable enclosure, whereby contents of each associated securable enclosure are safeguarded during any movement of such securable enclosures; and such communications modules may be each further configured for communicating with a central server over an associated network, for uploading of inventory data to such central server.

Another present exemplary embodiment relates to an electronic access control system for use with a plurality of securable enclosures and a central control server, including a plurality of microprocessor based access control circuits; a plurality of locks, configured to be respectively and controllably unlocked by such plurality of access control circuits; and a plurality of communication means. Such communication means are respectively associated with each of such access control circuits, for communication via an associated communications network between an associated central control server and each of such access control circuits, whereby access to an associated plurality of securable enclosures may be centrally controlled via electronically based communications from an associated central server.

In certain of such embodiments, optionally selected of such access control circuits may comprise master level circuits which are associated with a plurality of other circuits comprising slave level circuits thereunder, with such communications means respectively communicating operational data to each slaved microprocessor based access control circuit from its associated master level circuit. In other present alternatives, such exemplary electronic access control system may further include memory for storage of data associated with contents of an associated enclosure; and user interface means configured to provide a user access to such access control circuit through input data verified by such microprocessor, wherein such access control circuit is configured to unlock such lock based on input data verified by such microprocessor, and wherein such user interface is further configured to provide a user access to such memory for selective updating of data in such memory regarding contents of the associated enclosure, whereby inventory management is provided relative to the associated enclosure.

Yet further alternative present exemplary electronic access control systems may include a plurality of motion sensors, respectively associated with each of such access control circuits and its associated securable enclosure, for sensing movement of such securable enclosure; and user interface means configured to provide a user access to such access control circuits through input data verified by such microprocessor. Preferably in such alternative arrangements, such access control circuits are configured to unlock such lock based on input data verified by such microprocessor, and such user interface means is further configured to override such user access to such access control circuits and to lock such lock whenever such motion sensor senses movement of such securable enclosure. With such arrangement and related functionality, contents of an associated securable enclosure are safeguarded during any movement thereof.

A further present exemplary embodiment relates to an electronic access master/slave control system for use with a plurality of securable enclosures, comprising a plurality of microprocessor based slave access control circuits; a plurality of slave electronic locks, associated with respective securable enclosures, and configured to be respectively and controllably unlocked by such plurality of slave access control circuits; at least one microprocessor based master access control circuit and an associated master electronic lock; and a plurality of communication means, respectively associated with each of such access control circuits, for communication between such at least one master access control circuit and each of such slave access control circuits. Advantageously with such arrangements, access to a plurality of associated securable enclosures may be centrally controlled via electronically based communications from such master access control circuit.

In some present variations of the foregoing, such an electronic access master/slave control system optionally may further include a plurality of motion sensors, respectively associated with each of such access control circuits and its associated securable enclosure, for sensing movement of such securable enclosure; and user interface means configured to provide a user access to such access control circuits through input data verified by such microprocessor, wherein such access control circuits are configured to unlock such lock based on input data verified by such microprocessor, and wherein such user interface means is further configured to override such user access to such access control circuits and to lock such lock whenever such motion sensor senses movement of such securable enclosure, whereby contents of an associated securable enclosure are safeguarded during any movement thereof.

In other present alternatives, such communication means may be further configured for communication via an associated communications network between an associated central control server and each of such access control circuits, whereby access to an associated plurality of securable enclosures may be centrally controlled via electronically based communications from an associated central server. In still other alternatives, such systems may further additionally include memory for storage of data associated with contents of an associated enclosure; and user interface means configured to provide a user access to an access control circuit through input data verified by such microprocessor, wherein each access control circuit is configured to unlock such lock based on input data verified by such microprocessor, and wherein such user interface is further configured to provide a user access to such memory for selective updating of data in such memory regarding contents of an associated enclosure, whereby inventory management is provided relative to an associated enclosure.

In some present variations, such securable enclosures may comprise a plurality of cabinets (or groupings) having a respective plurality of drawers, with a slave access control circuit associated with each drawer thereof, and with a cabinet (or group) master access control circuit associated with each such cabinet.

Yet another present exemplary embodiment relates to an electronic access control system for use with a securable enclosure of the type having at least an exterior portion and a securable interior portion. Such system preferably includes a microprocessor based access control circuit associated with a given securable enclosure; a lock configured to be unlocked by such access control circuit, to selectively provide access to the associated securable enclosure; an alert means associated with such access control circuit and its associated securable enclosure, for sensing a condition relative to such securable enclosure; and a user interface configured to provide a user access to such access control circuit through input data verified by such microprocessor, wherein such access control circuit is configured to unlock such lock based on input data verified by such microprocessor, and wherein such user interface is further configured to output data to such user whenever such alert means senses a condition relative to such securable enclosure.

In certain of the foregoing systems, such alert means may comprise a motion sensor associated with such access control circuit and its associated securable enclosure, for sensing movement of such securable enclosure; and such user interface may be further configured to override user access to such access control circuit and to lock such lock whenever such motion sensor senses movement of such securable enclosure, whereby contents of the associated securable enclosure are safeguarded during any movement of such securable enclosure.

Per other present variations, an exemplary such system may further include a plurality of such systems respectively associated with a plurality of securable enclosures, each of which communicates with a central server over an associated network, for uploading of data to such central server regarding alert means sensing of conditions.

Another present exemplary embodiment in accordance with the present subject matter relates to an electronic access control system for use with a plurality of securable enclosures and a central control server, comprising a plurality of microprocessor based access control circuits; a plurality of locks, configured to be respectively and controllably unlocked by such plurality of access control circuits; memory, associated with each associated enclosure, for storage of data associated with contents thereof; user interface means configured to provide a user respective access to each of such access control circuits through input data verified by such microprocessors thereof, wherein such access control circuit is configured to unlock its respective lock based on input data verified by such microprocessor, and wherein such user interface means is further configured to provide a user access to an associated memory for selective updating of data in such memory regarding contents of the associated enclosure, whereby inventory management is provided relative to the associated enclosure; and a plurality of communication means. Preferably, such plurality of communication means are respectively associated with each of such access control circuits, for communication via an associated communications network between an associated central control server and each of such access control circuits, whereby access to an associated plurality of securable enclosures may be centrally controlled via electronically based communications from an associated central server.

In variations of the foregoing, such user interface means may include at least one of a keypad and a proximity card reader, and is further configured to be responsive to data provided by one of magnetic stripe cards, smart cards, RF fobs, IR fobs, iButtons, and biometric readers. Still further optionally, such user interface means may comprise a user readable display and a control panel configured to permit manual programming of operational parameters of an associated access control circuit by observation of such user readable display. In other variations, such user interface means may include at least one of a keypad, an electronic card reader, a biometrics reader, a remote computer interface communicating via a network, and a master level device.

Per other present alternatives, such electronic access control system may comprise one of a retrofit and original equipment relative to an associated plurality of securable enclosures.

In some alternatives, an associated communications network may include connections which are one of hardwired and wireless, including one of RF interface and 802.11 WiFi wireless network.

One present exemplary methodology relates to secured inventory management through use of an electronic access control system and a securable enclosure of the type having at least an exterior portion and a securable interior portion Such exemplary methodology preferably includes associating with a securable enclosure a lock configured to be unlocked by an access control circuit; providing memory for storage of data associated with contents of the associated securable enclosure; receiving and validating credentials from a user, in order to provide access by the user to contents of the associated securable enclosure by configuring the access control circuit to unlock the lock based on validated credentials from such user; and after unlocking of the lock, prompting the user to provide memory updates for updated data on contents of the associated securable enclosure. With such methodology, inventory management is provided for the contents of the associated enclosure.

In variations of such methodology, an additional step may further include relocking the lock after the memory is updated with updated contents data. In still others, such methodology may further include receiving an upload command, and thereafter forwarding updated data from such memory to a central location.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
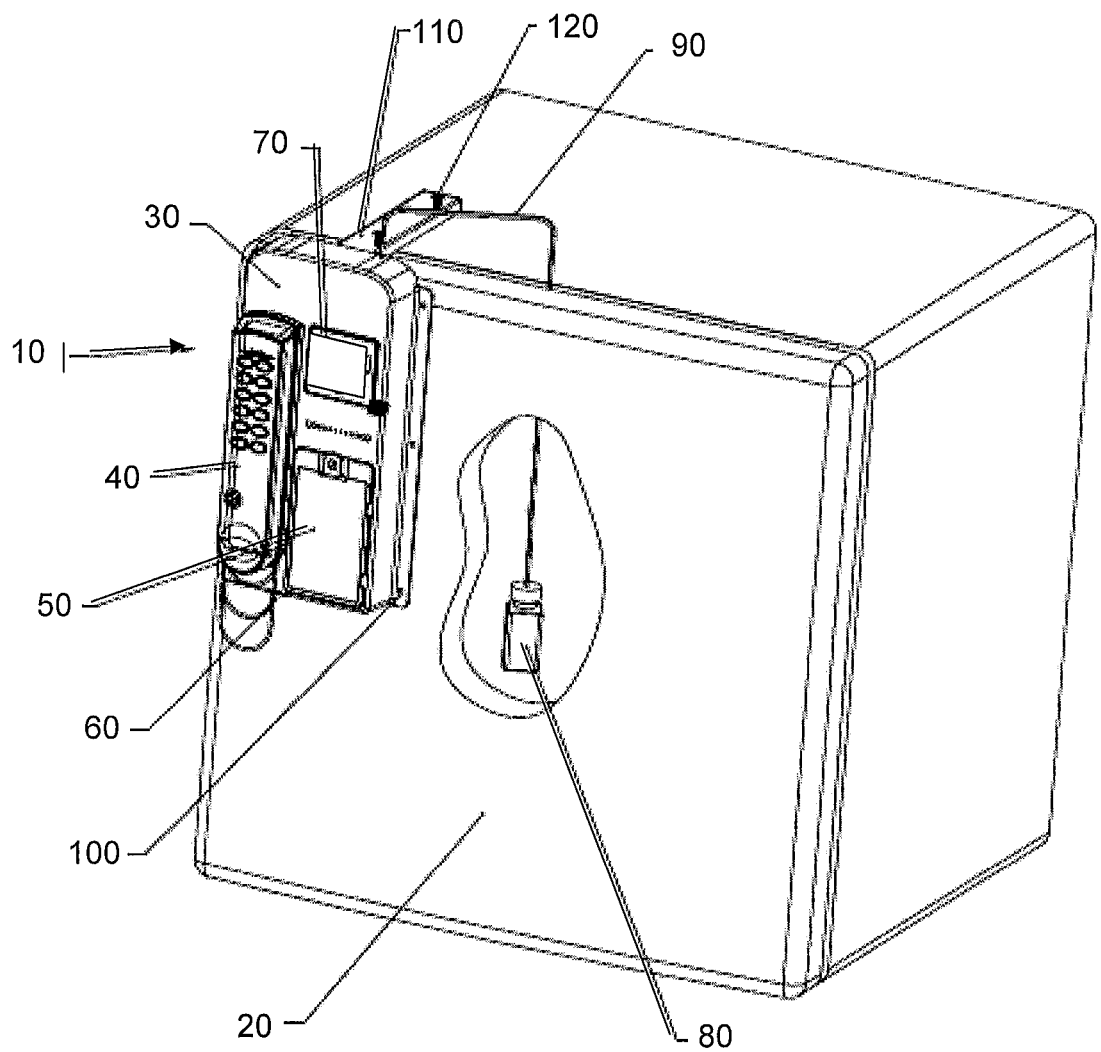
FIG. 1 depicts an upper right isometric view of an exemplary representative enclosure with a representative door thereof in a closed and locked position, further illustrated with an exemplary lock provided in accordance with one embodiment of the present technology installed in association therewith, and illustrating the door thereof in partial cutaway for illustration of various present features internal to such exemplary enclosure.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is concerned with electronically controlled access control systems.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

It should be specifically noted that while the present disclosure generally describes the lock disclosed herein as a retrofittable lock, such terminology should not be taken as a limitation of the present subject matter in any way as the presently disclosed lock may, indeed, be provided as original equipment.

The present subject matter relates to various features for electronically controlled lock systems. Such electronically controlled lock systems include one or more electronic locks used to provide secure storage of various items within a cabinet or enclosure. An exemplary electronic lock may include a motorized latch and an electronic access control circuit mounted within a plastic or similar housing and provided in the illustrated embodiment as a retrofittable lock for the cabinet or enclosure. The present subject matter equally encompasses original equipment installations of the present subject matter. A user interface may be provided such as through an LCD display screen and control panel mounted on the face of the housing. The control panel can include a key pad or the like for inputting data, settings, or other information to the electronic lock. In other embodiments, data, settings, or other information can be input into the system through an LCD touch screen or equivalent device, now or later existing.

Additionally, an optional temperature transducer (which preferably may be continuously monitored by the electronic access control circuit) may be provided for installation within a temperature controlled cabinet or enclosure. Preferably, in accordance with exemplary features disclosed herein, the housing may be easily mounted to most cabinets or enclosures in minimal time, with minimal tools, and without disassembly of the cabinet or enclosure. The optional temperature transducer and its associated wiring to the control circuit are also easily installed within the cabinet with minimal interference with the door seal. The main assembly readily mounts to the cabinet door or drawer or the like such as with tamper resistant sheet metal screws, double sided tape, or by other appropriate securing means including, for example, pop-rivets. The motorized latch in the main assembly may engage a rectangular or otherwise shaped hole in the strike, preventing the cabinet door from being opened.

It is to be understood by those of ordinary skill in the art that the present subject matter equally encompasses other optional features, different than just an optional temperature transducer. For example, one or more optional devices may be utilized with the present subject matter to detect a variety of environmental conditions, or other types of conditions. For example, either or both of temperature and humidity may be detected relative to a room or a piece of equipment, or vibrations levels or other characteristics of such room/equipment may be monitored.

In certain present embodiments, the LCD display of the electronic lock may continuously display temperature within the controlled enclosure, and, in conjunction with the control panel, may allow changes to be entered to, for example, temperature based programmable settings. Additionally, the unit may function to provide access control to the enclosure. The unit relatively quickly unlatches upon presentation of a valid access credential by the user: typically such as an entered PIN or electronic card. The control circuitry allows for a large number of different valid credentials to be used for access and has the ability to record each entry creating an "audit trail." Such "audit trail" may, for example, consist of the card or PIN number that gained access as well as the date and/or time of access.

The access control system also may provide a data-logging feature. In other words, in some presently preferred embodiments, users have the ability to view and download various data associated with the electronic lock, including "audit trail" data, temperature data, and/or inventory data. Such history can be viewed by pressing a designated button, such as an "up" button, on a keypad or on the LCD display screen, which may display for example the maximum observed temperature; or by pressing a "down" button on the keypad or LCD display screen, which may for example display the minimum observed temperature, or other keyboard conventions may be practiced. The data can be logged in predetermined increments with the size of the increment being set by the system administrator. In addition to viewing the max/min observed temperatures, the system for some embodiments may preferably be provided with the ability to connect a personal computer (PC), to facilitate downloading of the data containing the historical temperature record of the enclosure.

Additionally, present system embodiments may be provided with the ability to connect individual electronic locks over a network to other electronic locks and/or to a central server. Such network connections may be either hardwired or wireless, such as through an RF interface or through an 802.11 WiFi wireless network and/or through other technology, now or later known, details of which form no particular aspect of the present subject matter. Data and programming associated with individual locks and the access control system may be remotely downloaded/uploaded from or to the central server through such a network. As used herein, a network may include a dial-in network, a local area network (LAN), wide area network (WAN), public switched telephone network (PSTN), the Internet, intranet or other type(s) of networks, now or later existing, including hybrid and/or meshed networks. In general, a network in accordance with the present subject matter may include any number and/or combination of hard-wired, wireless, or other communication links.

An individual attempting access to the cabinet or enclosure will present their access control credential (for example, PIN, magnetic stripe card, proximity card, biometric input, etc.) to the access control circuitry through an associated appropriate reader. The access control circuitry compares the credential to a known list of valid credentials and determines validity. If the credential is valid, access will be granted.

According to an exemplary embodiment of the present technology, a motor/gear train assembly may be used to retract a slam latch bolt. A gear motor housing is attached to the inside of the main lock housing, which is attached to the front of the cabinet or enclosure. In the normal or locked state, a latching bolt protrudes from the top of the lock assembly, thereby engaging a strike plate mounted on top of the cabinet or enclosure. The interaction of the latching bolt and the strike plate prevents someone from surreptitiously gaining access to the cabinet or enclosure. When the slam latch bolt is drawn in, it is pulled out of the strike, which is attached to the top of the cabinet or enclosure, allowing the cabinet door to be opened.

Representative operation of the lock may proceed as follows. For purposes of this representative description, the starting point will be with the cabinet locked and a legitimate user attempting to enter the cabinet to acquire various items stored within the cabinet. To begin the open cycle, the user enters a credential or presents a biometric to the electronic lock. The access control circuitry compares the credential (or biometric) to a known list of valid credentials or biometrics. If the credential or biometric is deemed valid, the access control circuitry then checks if the user is approved for access to the enclosure. Upon validation of access permission, the access control circuit will then energize the motorized latch, retracting the slam bolt into the latch housing, allowing the cabinet door to be opened.

When the locking bolt is drawn into the motorized latch housing, it is also drawn into the main lock assembly. The latching bolt may be spring loaded by a return spring, biasing the latching bolt out of the motorized latch housing. Such arrangement removes the blocking interaction between the latching bolt and the strike plate, allowing the legitimate/authorized user to open the enclosure.

The latching bolt remains drawn into the motorized latch housing for a programmable amount of time, allowing the user to open the cabinet door and gain access to the contents of the cabinet. In an exemplary embodiment, such programmable amount of time may correspond to five seconds, though the use of other times is encompassed by the present subject matter. Upon expiration of the open delay timer, the motorized latch releases the latching bolt. It then re-extends out of the latch housing and out of the main assembly housing. The latching bolt is then in position to re-lock the cabinet door upon its closing.

When the user has completed accessing the cabinet, the user will slam the cabinet door. Such action will cause the latching bolt to hit the strike plate. The end of the latching bolt and the end of the strike plate are each preferably provided with cam surfaces which cause the latching bolt to push into the motorized latch housing when the cabinet door is closed (though other, equivalent arrangements may be practiced). When the latching bolt pushes into the motorized housing, the return spring is again charged. The strike plate is provided with a rectangular or otherwise shaped cutout section, located just past the cam surface, which is designed such that the latching bolt will enter it as the cabinet door closes.

After the latching bolt is pushed into the motorized latch housing and the door continues to close, the tip of the latching bolt preferably travels on the bottom of the strike plate for some distance. Eventually, the tip encounters the rectangular cutout on the strike plate, whereupon the charged spring on the latching bolt causes it to re-extend from the motorized latch housing, entering the rectangular cutout section of the strike, and locking the cabinet. The microprocessor then records the event, recording the card/pin number that accessed the cabinet as well as the date and time.

As described above, there are numerous variable settings for the access control system encompassed by the present subject matter, for example, such as which users can access which locks. Other settings include (but are not limited to) inventory management settings, temperature limit settings, alarm status, and supervisor status required after alarm settings. In accordance with the present subject matter, such settings can be input through a control panel on the front of the system, or from a remote device, such as through a PC or other computing device that is either directly connected to the lock or remotely connected to the lock over a network.

Additionally, exemplary present system embodiments may preferably be provided with master-slave control capabilities such that a user can control the operation of one or more slave electronic locks operably connected or networked to the master lock by presenting credentials at the master lock. For instance, a medical cart can have a single master lock and a plurality of slave electronic locks providing secure storage to the multiple different doors and drawers on the medical cart.

When an authorized doctor or other authorized user presents credentials to unlock the master electronic lock for the medical cart, the master electronic lock can control the plurality of slave electronic locks such that one or more of the slave electronic locks are also unlocked. In this manner, such doctor or other user can advantageously per present subject matter more efficiently unlock a plurality of electronic locks by presenting credentials at the master lock.

The system can also be provided with inventory management capability whereby the electronic lock is configured to store and track individual items or particular types of items stored/kept in an enclosure. For instance, a user that has retrieved an item from an enclosure can input one of a variety of preprogrammed codes into the control panel of the electronic lock. The electronic lock will process the code to update stored inventory data at the electronic lock. The inventory data can then be uploaded to a central server over a network or uploaded to a PC or other computing device operably connected to the electronic lock.

Additionally, the electronic access control system can include one or more electronic locks that have a motion sensor configured to determine whether the enclosure secured by the electronic lock is being moved or otherwise transported. The electronic lock can be programmed to lock or to remain locked while the motion sensor provides a signal indicating that the enclosure secured by the electronic is being moved or otherwise transported. In such manner, an electronic lock according to certain aspects of the present technology can ensure that a door or drawer of an enclosure remains closed and secured while the enclosure is being moved or otherwise transported.

Reference will be made in detail to the various exemplary embodiments of an electronic lock in accordance with the present subject matter. Referring to the drawings, FIG. 1 illustrates an upper right perspective view of a cabinet generally 20 with its door in its closed and locked position with a lock generally 10 in accordance with the present technology installed thereon. Lock 10 includes a main housing 30, electronic assembly 40, battery pack 50, communications port 60 (part of communication means herein for communication of various system components with external devices), and LCD display 70. Lock 10 may optionally include a programming keypad to input data or other settings or information into lock 10. In other embodiments, a user can input data or other settings or information through a touch screen LCD display 70, or other appropriate mechanism.

Lock 10 may be attached to cabinet 20 with use of sufficiently securing devices, for example, such as a plurality of screws collectively noted as screw 100. Lock 10 is configured to engage a strike assembly 110 that, when properly positioned, keeps the cabinet locked. Strike assembly 110 may be attached to the cabinet 20 by screws or by other appropriate means including, but not limited to, pop-rivets, double sided tape, adhesives, and/or welding. Electronic assembly 40 is optionally electrically connected to thermistor assembly 80 by way of cable 90 (where temperature feedback is employed). Of course, it is to be understood by those of ordinary skill in the art that other components may be practiced in particular embodiments. For example, where relatively higher degree of accuracy is desired or needed, a platinum resistance temperature detector (RTD) may be used in place of a thermistor assembly, and all such variations are intended as coming within the scope of the present subject matter.

Figure 2:
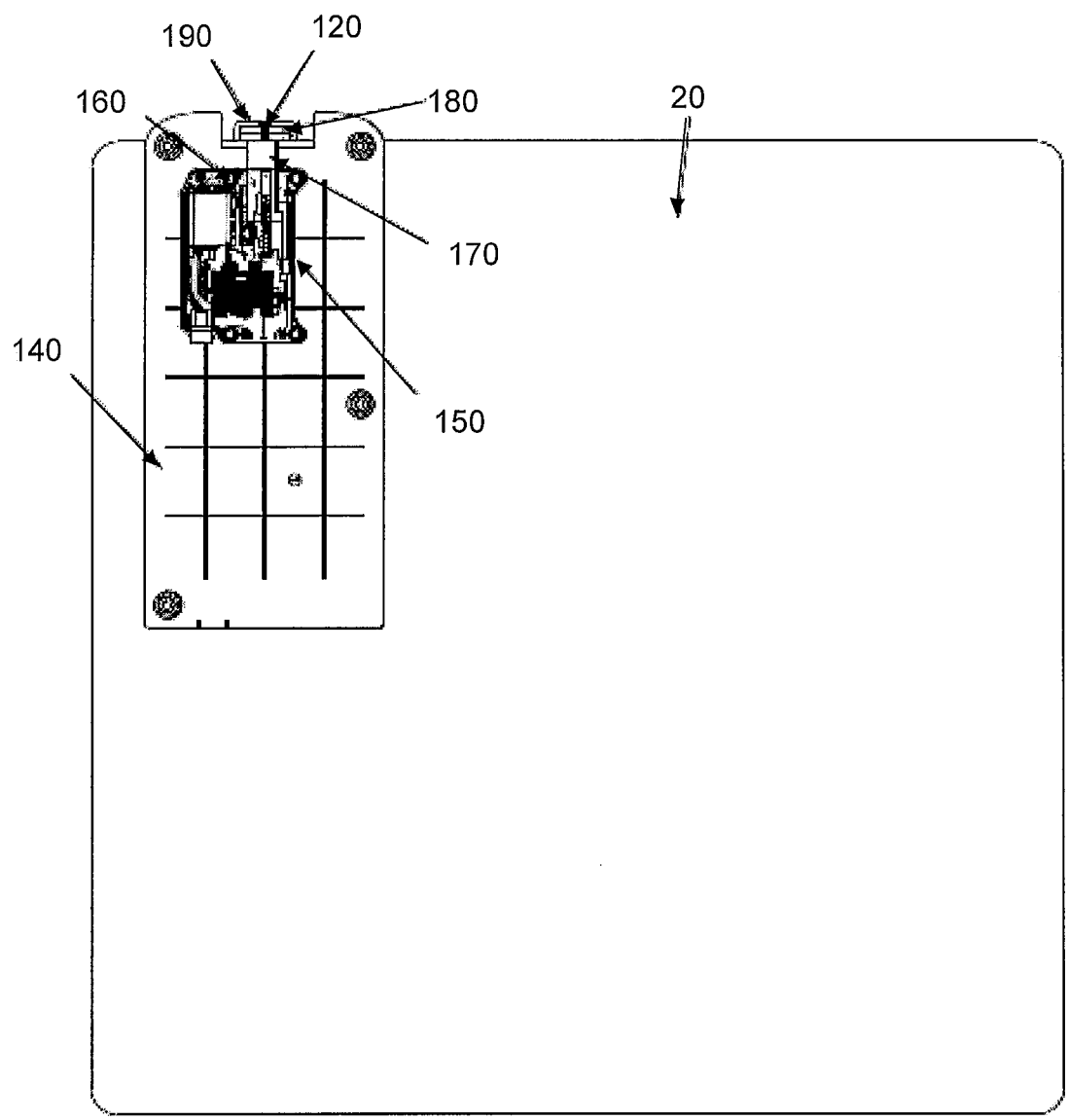
FIG. 2 depicts a front elevation view of an enclosure in accordance with one embodiment of the present technology and illustrating an exemplary present lock with cover portions thereof removed and with a latch bolt thereof engaging a present exemplary strike plate.

With reference to FIG. 2, there is illustrated a front view of a cabinet 20 in accordance with the present technology and illustrating a lock 10 with cover portions removed and exemplary latch bolt 170 thereof engaging a strike plate 180. A back cover 140, shown for reference purposes, may be attached to main housing 30 with screws (not illustrated) or by other appropriate means, as well understood by those of ordinary skill in the art without requiring additional detailed disclosure. Motorized latch assembly generally 150 is attached to main housing 30 with a plurality of screws exemplarily noted by screw 160. Latch assembly 150 is provided with latch bolt 170 which engages an opening in strike plate 180 in the locked position to keep cabinet 20 locked. Strike plate 180 is attached to the top of the cabinet such as with mounting screws (not illustrated) and may be provided with a cover 190 which may be attached to strike plate 180 with a plurality of screws 120 or by other appropriate means.

Figure 3A:
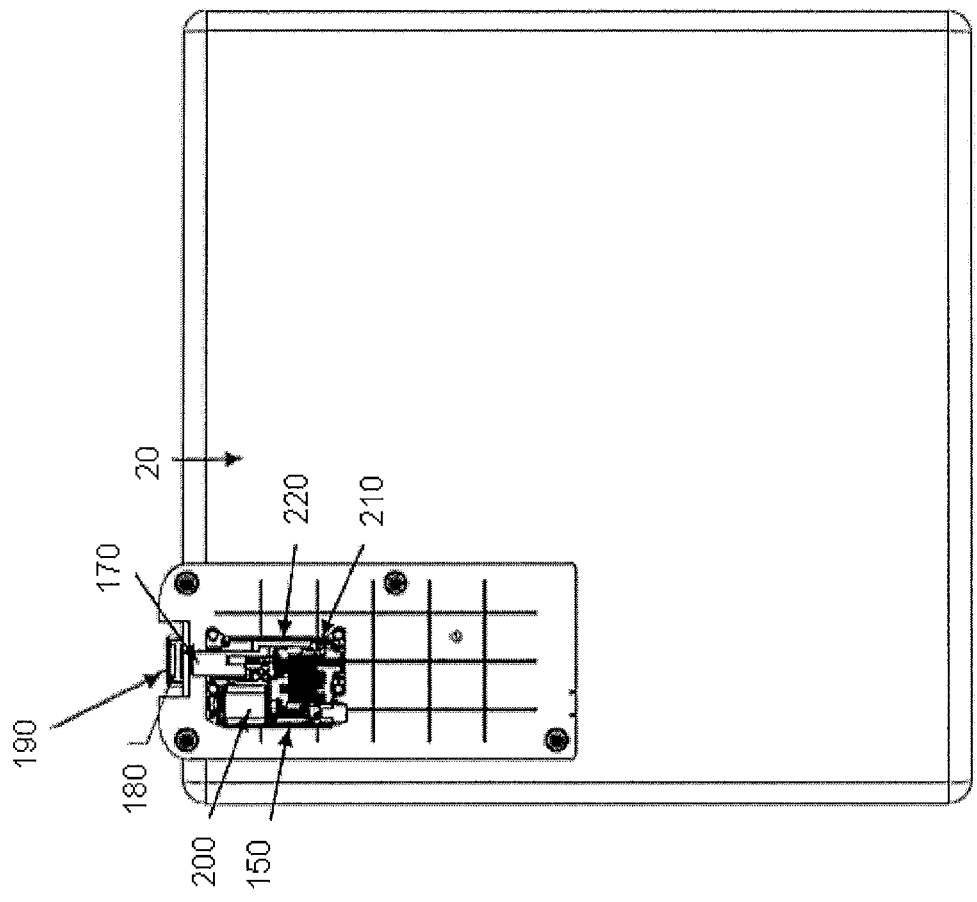
FIG. 3A depicts a front elevation view of an enclosure similar to that of FIG. 2 but partially illustrating internal components of an exemplary present latch thereof with an exemplary latch bolt thereof retracted.
Figure 3B:
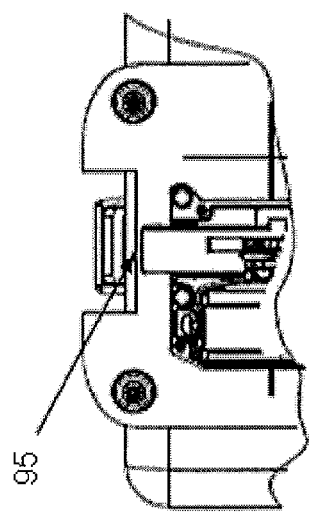
FIG. 3B depicts an isolated, relatively enlarged view of a portion of exemplary present lock subject matter as illustrated in FIG. 3A, and illustrating in greater detail the retracted latch bolt thereof.

With reference to FIGS. 3A and 3B, there are illustrated, respectively, a front view of a cabinet 20 illustrating internal components of exemplary present motorized latch 150 with latch bolt 170 retracted, and an enlarged view of a portion of the lock illustrating retracted exemplary latch bolt 170. Those of ordinary skill in the art will appreciate that various mechanisms can be used to accomplish the same end result, that is, the retraction of bolt 170 into the motorized latch 150, and that the illustrated mechanism corresponds to exemplary such method and apparatus.

The prime mover in the exemplary embodiment of motorized latch 150 is motor 200. In an exemplary embodiment, a permanent magnet DC motor may be used; however, various types of motors may be employed in accordance with the present subject matter. Motor 200 may be provided with gear train 210 that moves mechanism 220, which in turn retracts latch bolt 170 into latch 150. When latch bolt 170 is retracted, the blocking interaction of latch bolt 170 with strike plate 180 is removed, as shown more clearly by reference numeral 95 in FIG. 3B.

Figure 4A:
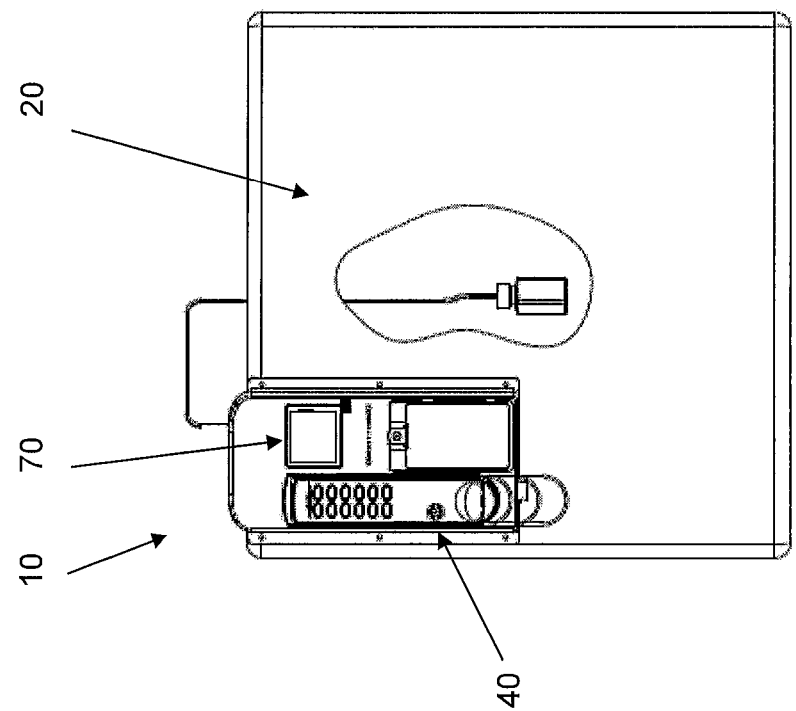
FIG. 4A depicts a front elevation view of an exemplary enclosure having an exemplary present lock installed thereon and illustrating a control panel comprising an LCD display screen.
Figure 4B:
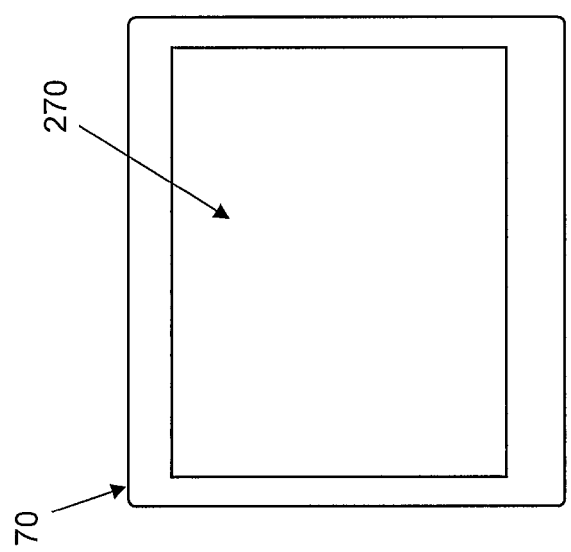
FIG. 4B depicts an enlarged portion of the representative control panel of present FIG. 4A, particularly illustrating the exemplary LCD display screen thereof.

With reference to FIGS. 4A and 4B, there are illustrated a front view of a cabinet 20 having a lock 10 installed thereon and illustrating an electronics assembly 40 including a control panel 70 for programming certain operational characteristics of the lock in accordance with the present technology. FIG. 4B illustrates an enlarged portion of control panel 70 particularly illustrating the LCD display 270 thereof.

Motor 200 (FIG. 3B), and thereby latch bolt 170, are operated preferably under the control of a microprocessor based circuit located within electronics assembly 40, though other electronic control arrangements may be practiced. In accordance with the illustrated exemplary embodiment of the present technology, electronics assembly 40 receives input from a user attempting to gain access to the cabinet via the key pad on electronics assembly 40. It should be appreciated by those of ordinary skill in the art that a variety of different types of access control credentials may be used instead of or in addition to the key pad on electronics assembly 40. Such credentials may include, but are not limited to, proximity cards, magnetic stripe cards, smart cards, RF fobs, IR fobs, and Dallas Semiconductor i-Buttons, as well as a plethora of biometric type access control technologies available to industry.

When electronics assembly 40 receives data (in an exemplary case a personal identification number (PIN)) from a user, electronics assembly 40 processes such PIN and determines the validity of the code. Typically, electronics assemblies of such type will have a number of available valid codes. In accordance with an exemplary embodiment, 250 valid codes may be provided. It should be appreciated, however, that such number is a design limitation determined primarily by specific needs associated with a particular installation of lock model and the amount of memory installed in the device, and not a particular limitation of broader aspects of the present subject matter. Accordingly, different numbers of codes may be practiced with various embodiments of the present subject matter.

Electronics assembly 40 is configured to compare an entered PIN to its list of pre-programmed valid codes. If the code is determined to be valid, access is granted and the electronics assembly 40 turns on motor 200. The lock can be programmed manually or through a personal computer (PC) based program from a remote computing device directly connected to the lock or connected to the lock over a network.

With further reference to FIG. 4A, it will be seen that the front of the lock assembly 10 may in some embodiments include a control panel 70. Control panel 70, more specifically illustrated in FIG. 4B, can correspond to a touch screen LCD display 270; however, other types of displays may also be employed. Control panel 70 can include buttons which can be used in combination with the display to navigate a menu based programming scheme. The programming scheme preferably is used to select or unselect various programming options within a lock constructed in accordance with the present technology.

Figure 5:
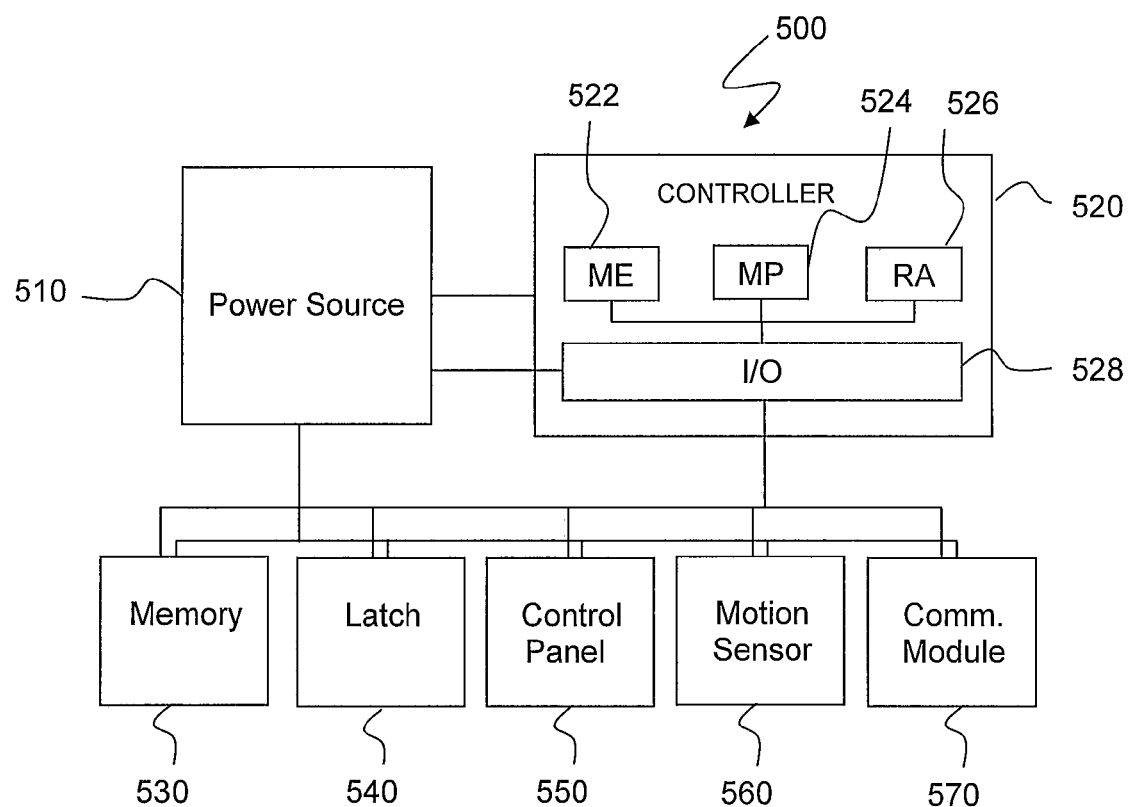
FIG. 5 depicts a block diagram overview of an exemplary electronic lock according to one exemplary embodiment of the present technology.

Referring to FIG. 5, a block diagram of an exemplary electronic lock generally 500 is shown in accordance with one embodiment of the present technology. As illustrated, electronic lock 500 may include a power source 510, a controller 520, memory 530, latch 540, control panel 550, motion sensor 560 (one embodiment of part of alert means herein), and communications module 570 (part of communication means herein for communication of various system components with external devices). Power source 510 may be any power device for supplying power to the electronic lock 500. For instance, power source 510 may be a battery pack or other power pack, now or later existing, that provides electrical or equivalent power to electronic lock 500.

In certain embodiments, power source 510 can be a battery pack that is capable of being removably connected to electronic lock 500. For instance, power source 510 can include a battery pack that is capable of being engaged to electronic lock 500 to provide power to electronic lock 500 and disengaged from electronic lock 500 in order to charge the battery pack. In such manner, a power source 510 can be easily disengaged from electronic lock 500 and recharged as necessary for convenience. Using the disclosures provided herein, those of ordinary skill in the art should appreciate that the present technology is not limited to any particular power supply and that a variety of different power supplies can be used without deviating from the scope or spirit of the present subject matter.

In one exemplary embodiment, power source 510 is a self-contained battery pack that includes an integral battery charger. The battery charger is matched with the particular type and size of battery(ies) that are incorporated into battery pack. Self-contained battery pack can be removably connected to electronic lock 500 and disengaged from electronic lock 500 as discussed above. Accordingly, different battery sizes and types as well as different recharge technologies can be incorporated with electronic lock 500, allowing for relatively easy upgrade to different battery sizes and recharge technologies. The self-contained battery charger provides advantages over electronic locks having chargers built into the main electronics package that limit the electronic lock to only one battery technology and capacity, although various embodiments of the present subject matter may also be practiced with non-self-contained battery charger arrangements.

Power source 510 is operatively connected to both the controller 520 and to the various other components of the electronic lock. Controller 520 may have the capability to control power supply 510 to selectively provide power to the various components of the electronic lock 500 or to remove power from the various components of electronic lock 500. For instance, controller 520 may be configured to control when the communications module 570 receives power from the power supply 510 so that the controller 520 may selectively power on or power off the communications module 570 in accordance with certain aspects of the present technology. In addition, power source 510 may be able to communicate various operating conditions, such as state of charge for a battery pack (for example, on a percentage basis), to controller 520.

Controller 520 is the main processing unit of electronic lock 500. Controller 520 may include a memory 522, microprocessor 524, random access memory 526, and input/output device 528, as shown in FIG. 5. Those of ordinary skill in the art, using the teachings provided herein, should appreciate that the present subject matter is not limited to any particular controller 520, but more generally may include any device configured to control the various components of the electronic lock 500.

Controller 520 may be programmed with various instructions to perform various functions in accordance with aspects of the present technology. For instance, controller 520 may include one or more computing devices that are adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to, application-specific circuits. Of course, combinations of computer-executed software and hard-wired logic or other circuitry may be suitable, as well, including later created technologies. In a typical implementation, the controller could use a microcontroller chip attached to a memory device as well as other hardware to assist with various functions. The microcontroller could execute a special-purpose program produced using any programming language or combination of languages as may be suitable for the purpose, and as may presently exist or be later developed. While present technology lends itself to the use of separate chips for the CPU, memory, and other interface logic, the design would be just as applicable if some or all of those functions were combined into one or more larger chips.

Electronic lock 500 may include a memory 530 connected to the controller 520. Memory 530 may be used to store various types of data associated with electronic lock 500 and/or an electronic access control system. For instance, memory 530 may be used to store user data, such as, user name, credential type and ID, supervisor level, and valid access times; lock data, such as lock name, access hardware (e.g., keypad or hardware), and open time; relational data detailing which users can access or open which electronic locks; and audit trail data and/or temperature data. As discussed in detail below, memory 530 can also be used to store inventory data such that electronic lock 500 can provide inventory management capabilities.

Electronic lock 500 can include a latch mechanism 540 that is operatively connected to controller 520. Latch mechanism 540 may be similar to the electronic latch assembly discussed above or may be any other latch mechanism configured to secure a cabinet or enclosure. Per the present subject matter, when latch mechanism 540 receives a command from controller 520, the latch assembly locks the cabinet or enclosure for which the electronic lock 500 is used to provide secure storage.

The subject exemplary embodiment of a present electronic lock may further include a control panel 550. As discussed above with reference to FIGS. 4A and 4B, control panel 550 can include a visual display and user interface such as a keypad (part of user interface means herein for interface between a user and various system components). The control panel 550 allows for a user to input and/or manipulate data or other information into the lock and to visually inspect certain settings, features, and/or data or other information associated with the lock. The visual display can be an LCD display screen or any other type of display screen for displaying visual or other information to a user. In certain embodiments, the LCD display screen can be a touch screen that allows a user to input and/or manipulate data, settings or other information into the electronic lock 500 by simply touching the LCD display screen.

As illustrated, electronic lock 500 in some embodiments can include a motion sensor 560. Motion sensor 560 can be any device configured to determine whether the enclosure or cabinet secured by electronic lock 500 is being moved or otherwise transported. For instance, motion sensor 560 can incorporate infrared or laser technology for optical detection. In other embodiments, motion sensor 560 can include a ball bearing sensor. In still other embodiments, the motion sensor 560 can include one or more cameras operably connected to controller 520. Controller 520 can process the images recorded by the cameras according to techniques known to those skilled in the art to determine whether the enclosure or cabinet secured by electronic lock 500 is being moved or otherwise transported.

Motion sensor 560 can send a signal to controller 520 when motion sensor 560 detects movement of the cabinet or enclosure. In response to such control signal, controller 520 can determine whether the electronic lock is locked or unlocked. If the electronic lock is unlocked and does not provide secure storage to the enclosure, then controller 520 can be configured to sound an alarm indicating that a door or drawer of enclosure is not secured by electronic lock. A user can then lock the electronic lock such that the door or drawer of the enclosure is secured while the enclosure is being moved or otherwise transported. In other embodiments, controller 520 can send a control signal to latch 540 such that latch 540 automatically locks to provide secure storage to the enclosure. In such manner, an electronic lock with motion sensor control as discussed herein can provide for the safe movement or other transportation of an enclosure.

Still referring to FIG. 5, controller 520 may be operatively connected to communications module 570 which in some embodiments may be used to interface electronic lock 500 to a network, to a computing device, or to other electronic locks. Generally speaking, communications module 570 may be any device for enabling communication with other electrical devices, details of which form no particular aspect of the present subject matter. For example, the communications module may be a modem configured to communicate with either of a hardwired or wireless network, a Bluetooth communications module, an RF communications module, or any other device that enables communications with a network or remote device. In a particular embodiment, communications module 570 may be a modem adapted to enable communications over an 802.11 WiFi wireless network.

Figure 6:
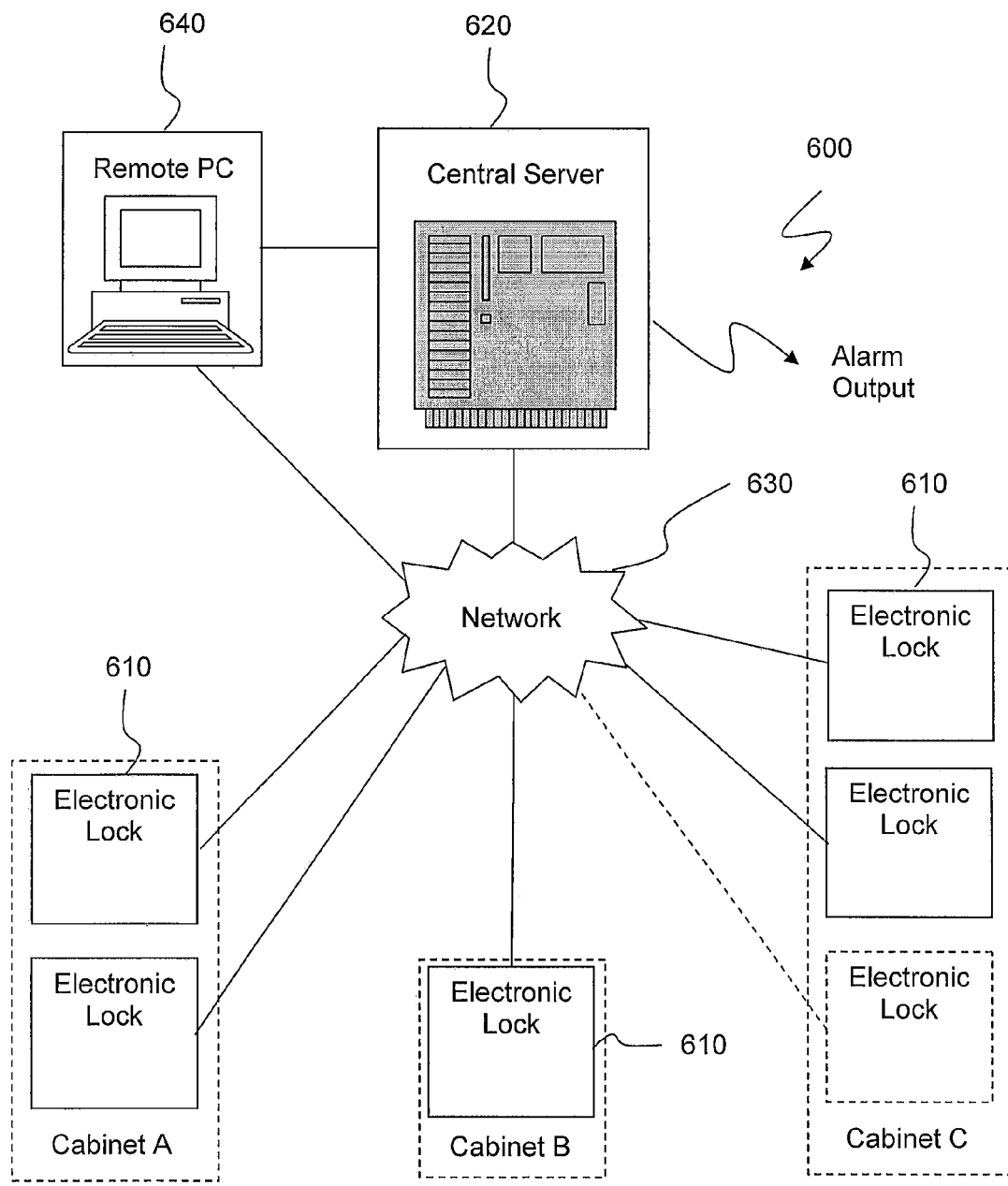
FIG. 6 depicts an exemplary present electronic access control system including a plurality of electronic locks used to secure a plurality of drawers on a variety of different enclosures or cabinets according to one exemplary embodiment of the present technology.

With reference to FIG. 6, a block diagram of an exemplary electronic access control system generally 600 used to secure a plurality of cabinets or enclosures is illustrated. Electronic access control system 600 includes a plurality of electronic locks 610 operatively connected to central server 620 over network 630. Based on the disclosure provided herein, one of ordinary skill in the art will recognize that the inherent flexibility of computer-based systems allows for a great variety of possible configurations, combinations, and/or divisions of tasks and functionality between and among components of the electronic access system 600. For instance, server processes discussed herein may be implemented using a single server or multiple servers working in combination. Databases and applications may be implemented on a single system or distributed across multiple systems. Distributed components may operate sequentially or in parallel.

In electronic access control system 600, a plurality of electronic locks 610 are used to secure multiple cabinets, including exemplary/representative Cabinet A, Cabinet B, and Cabinet C. The number of cabinets shown is representative only, and not a limitation of the present subject matter. Each of such cabinets may have one or more drawers or other secure locations for which an individual electronic lock 610 is required or desired. For instance, Cabinet A is illustrated as having two electronic locks 610. Such two electronic locks 610 may be for separate drawers or other enclosures in Cabinet A. Similarly, Cabinet C is illustrated as having three electronic locks 610. Such three electronic locks 610 may be for separate drawers or other enclosures within Cabinet C. The third electronic lock 610 of Cabinet C is illustrated in dashed line to signify that any number of electronic locks 610 may be associated with a single cabinet or enclosure.

As shown in FIG. 6, the plurality of electronic locks 610 may be connected to a central server 620 over a network 630, per the present subject matter. In such manner, updates and other data manipulation and control can occur at the central server 620 and be communicated to each of the plurality of electronic locks 610 over network 630. Data can be managed at the central server 620 or via a remote computing device 640 operatively connected to central server 620.

Network 630 may be any hardwired or wireless network or combinations thereof for connecting the plurality of electronic locks 610 to central server 620. For example, a network can comprise a dial-in network, a local area network (LAN), wide area network (WAN), public switched telephone network (PSTN), the Internet, intranet or other type(s) of networks, now or later existing. A network may comprise any number and/or combination of hard-wired, wireless, or other communication links.

In one embodiment, the plurality of electronic locks 610 are connected to central server 620 through a 802.11 WiFi network interface. Enabling wireless communication over an 802.11 WiFi network has many advantages, including, for example, facilitating the exchange of data between a central server and an electronic lock that is used to secure a mobile cabinet or enclosure that would be difficult to connect to a hard wired network. Electronic locks 610 may interface with network 630, for example, through communications module 570 shown in FIG. 5.

As will be discussed in more detail below, an electronic access control system according to certain embodiments of the present technology can include master-slave access control capabilities. In such exemplary aspect of the present technology, a master electronic lock can be used to control the unlocking of one or more slave electronic locks operably connected to the master electronic lock. The master electronic lock sends a control signal over a network to the slave electronic lock directing the slave electronic lock to provide access or to provide secure storage to the enclosure secured by the slave electronic lock. The particular slave electronic locks controlled by the master electronic lock can be determined according to programmed instructions provided to the electronic access control system.

For example, an enclosure may include a single master electronic lock and a plurality of slave electronic locks providing secure storage to a plurality of different doors and drawers on the enclosure. A user can access the contents of a particular drawer or door of the enclosure by providing credentials to the particular electronic lock providing secure storage to the door or drawer. If a user must gain access to multiple different doors and drawers, the user must provide credentials to each separate electronic lock protecting such doors or drawers. This can be inefficient and frustrating to a user that must access items stored in multiple different drawers or doors of the enclosure at the same time.

Alternatively, according to certain exemplary aspects of the present technology, a user can provide credentials to a master electronic lock operably connected through a network to one or more slave electronic locks. The slave electronic locks provide secure storage to different doors and drawers of the enclosure. If a user presents valid credentials to the master electronic lock, the master electronic lock preferably will control one or more of the plurality of slave electronic locks to provide access to the different doors and drawers on the enclosure. In particular, the master electronic lock will send a control signal over a network directing one or more of the slave electronic locks to provide access to the enclosure, door, or drawer. In this manner, a user can simultaneously open or close multiple electronic locks by providing credentials to the master electronic lock.

The particular slave electronic locks unlocked by the master electronic lock will depend on programmed instructions provided to the electronic access control system. The number and location of slave electronic locks opened by the master electronic lock can depend on numerous factors, including the status of the user providing credentials to the master electronic lock. For instance, a master electronic lock may send a control signal directing all slave electronic locks operably connected to the master electronic lock to provide access when a supervisor provides credentials to the master electronic lock. However, the master electronic may send a control signal to only a select number of slave electronic locks operably connected to the master electronic lock when a different user provides credentials to the master electronic lock.

Figure 7:
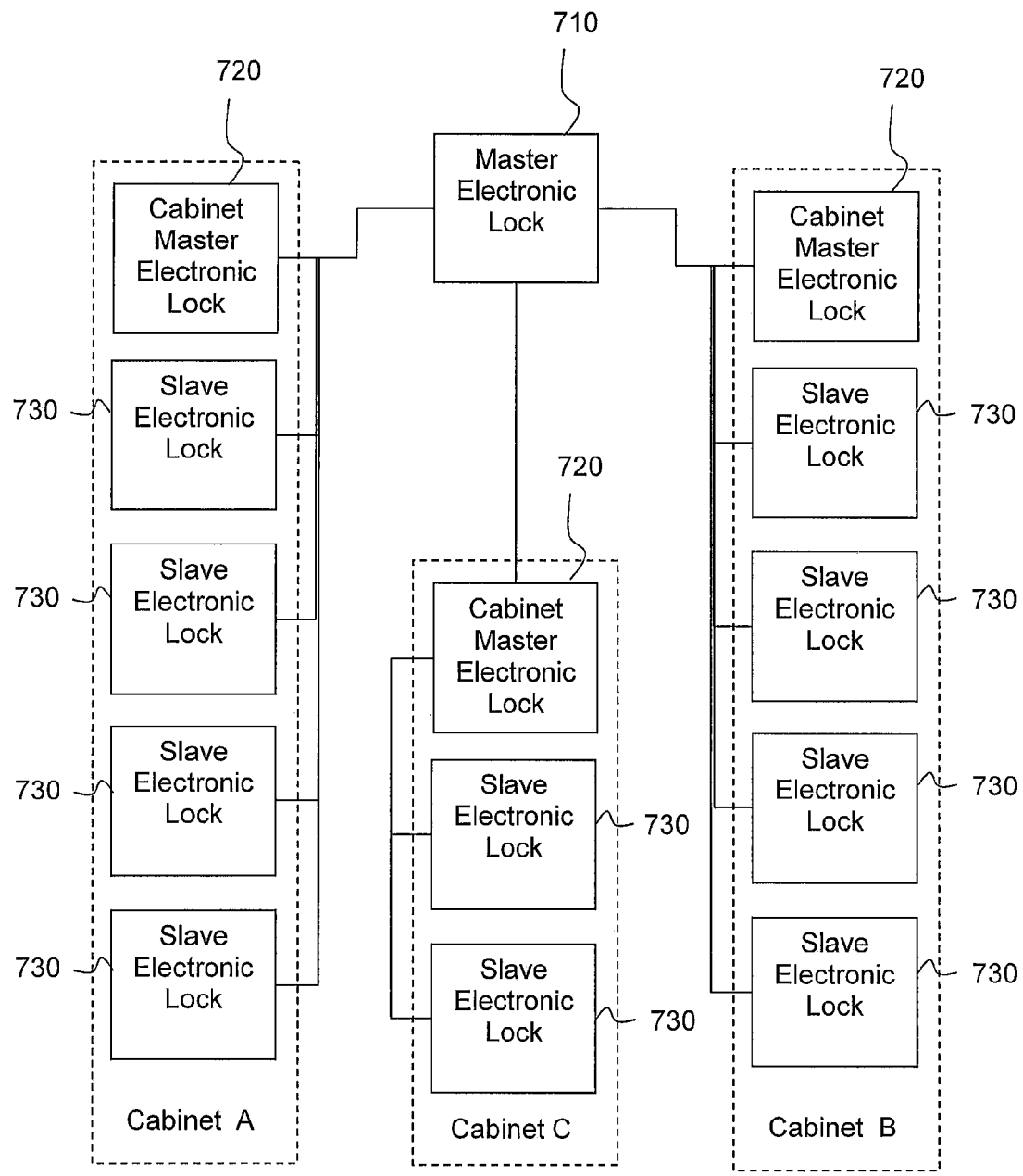
FIG. 7 depicts an exemplary electronic access control system having master-slave control capabilities according to one exemplary embodiment of the present technology.

With reference now to FIG. 7, an exemplary electronic access control system with master-slave control capabilities will be discussed in detail. FIG. 7 illustrates three representative cabinets, Cabinet A, Cabinet B, and Cabinet C, each with a plurality of electronic locks. Each electronic lock can be used to provide secure storage to a door or drawer of Cabinet A, Cabinet B, or Cabinet C. As illustrated, each cabinet includes a cabinet master electronic lock generally 720. Each cabinet master electronic lock 720 is operably connected to a plurality of slave electronic locks 730.

A user can gain access to one or more of the plurality of slave electronic locks 730 providing secure storage to a door or drawer on Cabinet A by presenting valid credentials to master electronic lock 720 protecting Cabinet A. The number of slave electronic locks 730 opened by master electronic lock 720 will depend on programmed instructions provided to the electronic access control system. For instance, the master electronic lock 720 can send a control signal to open only one slave electronic lock 730, two slave electronic locks 730, three slave electronic locks 730, or all four representative/exemplary slave electronic locks 730. In particular embodiments, the number of slave electronic locks opened by a master electronic lock can depend on the status of the user that presents credentials at the master electronic lock. For instance, a master electronic lock can provide access to all slave electronic locks when a supervisor provides credentials to the master electronic lock. However, the master electronic lock may be configured per present subject matter to only provide access to a select number of slave electronic locks when another user provides credentials to the master electronic lock. For example, user #1 may in certain embodiments only gain access to two slave electronic locks, while user #2 may only gain access to a single slave electronic lock. The master-slave control instructions can be input through the control panel on an individual electronic lock, through a PC or other computing device connected to an individual electronic lock, or through a central server connecting the plurality of electronic locks.

As illustrated, Cabinet B and Cabinet C similarly include a master electronic lock 720 that can control one or more of a plurality of slave electronic locks 730 in the manner discussed above.

It should be noted that a master electronic lock 720 can also in accordance with the present subject matter act as a slave electronic lock. As illustrated in FIG. 7, cabinet master electronic locks 720 are operably connected to master electronic lock generally 710. Master electronic lock 710 can control cabinet master electronic locks 720 as well as slave electronic locks 730. For instance, master electronic lock 710 can send a control signal to cabinet master electronic locks 720 providing secure storage to Cabinet A, Cabinet B, and Cabinet C, directing cabinet master electronic locks 720 to provide access to Cabinet A, Cabinet B, and Cabinet C, respectively. Cabinet master electronic locks 720 can then in turn send a control signal to one or more slave electronic locks 730 directing the slave electronic locks to provide access to one or more drawers or doors on Cabinet A, Cabinet B, and Cabinet C. In such manner, a user can gain access to one or more of Cabinet A, Cabinet B, or Cabinet C as well as to individual doors and/or drawers in Cabinet A, Cabinet B, and Cabinet C by simply providing valid credentials to master electronic lock 710. In such manner, the electronic access control system according to this exemplary aspect of the present technology can provide for more efficient access to a plurality of different enclosures and drawers and doors contained on such enclosures.

While the exemplary master-slave control technology has been discussed above with reference to control signals directing slave electronic locks to unlock and provide access to enclosures, those of ordinary skill in the art, using the disclosures provided herein, should readily appreciate that a master electronic lock can similarly provide a control signal directing a slave electronic lock to lock and provide secure storage to enclosures. Moreover, based on the disclosure provided herein, one of ordinary skill in the art will further recognize that the particular configuration of the master-slave control capabilities and functionality between and among components of the electronic access system can have any of a variety of configurations and settings, all variations of which are intended as being encompassed by the present subject matter.

Figure 8:
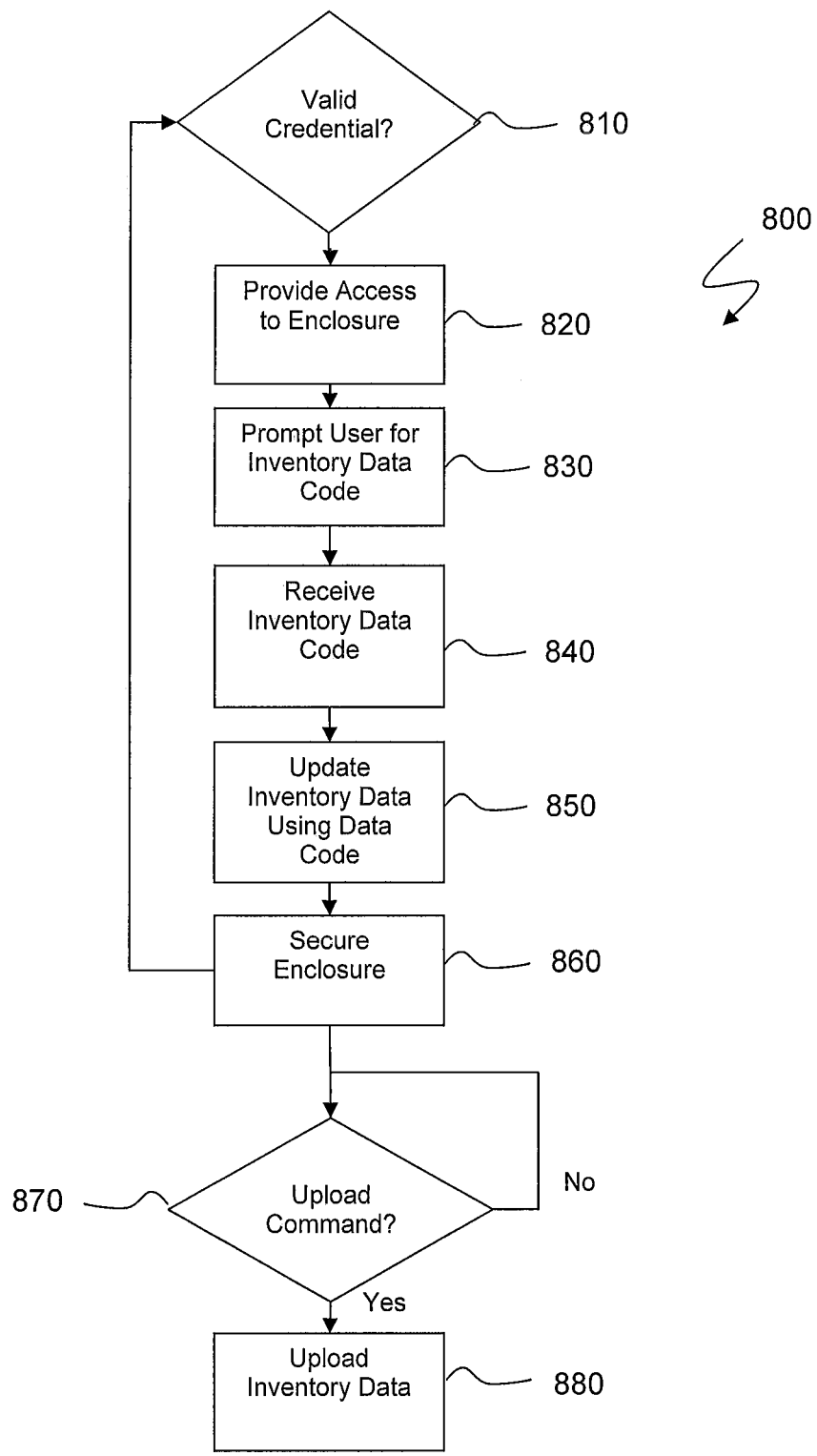
FIG. 8 depicts a flow diagram illustrating exemplary steps associated with one exemplary embodiment of the present technology.

In accordance with additional aspects of exemplary embodiments of the present subject matter, methodologies are provided for inventory control at the individual electronic locks. Referring now to FIG. 8, a flow chart illustrating exemplary steps associated with methodology generally 800 for managing inventory data in an electronic access control system according to one exemplary embodiment of the present technology is disclosed.

At step 810, the present electronic lock waits for a user to input valid credentials into the electronic lock. Once the electronic lock receives valid credentials, the electronic lock provides access to the enclosure protected by the electronic lock, as represented by step 820. While a user has access to the enclosure, the user may retrieve items stored in the enclosure and/or place new items into the enclosure. Often times, there is need to store and track individual items or particular types of items stored in a cabinet or enclosure. For instance, one such circumstance may be in the field of controlled medications (i.e., medicinal products) and, in particular, narcotics as may be administered to patients in a medical facility. Another application may be in the storage of tools or other parts in enclosures. The present technology provides for the capability to manage and store inventory data at the electronic lock regarding the status of individual items or particular types of items stored in a cabinet or enclosure.

In particular, at step 830, the electronic lock may prompt the user to enter an inventory data code. As used herein, the term inventory data code is intended to refer to any data or other information input into the electronic lock that contains information concerning the inventory stored in the enclosure secured by the electronic lock. For instance, the inventory data code can be a multi-digit alphanumeric code signifying that a user removed a particular item from the enclosure, placed an item in the enclosure, or made no change to the inventory of the enclosure. In other embodiments, the inventory data code can simply be information input by a user by navigating through menus displayed on the display screen of an electronic lock.

At step 840, the electronic lock receives an inventory data code input by a user. The inventory data code can be input into the control panel of the electronic lock. At step 850, the electronic lock updates inventory data based on the inventory data code. For instance, if the inventory data code indicates that a particular item was removed from the enclosure, the inventory data is updated to reflect the removal of such item from the enclosure. If the inventory data code indicates that a particular item was added to the enclosure, the inventory data is updated to reflect the addition of such item to the enclosure. After the inventory data has been updated, the electronic lock can be locked so as to provide secure storage to the enclosure as represented by step 860. The electronic lock then waits for a valid credential so that it can provide access to the items stored in the enclosure.

As illustrated at step 870, while the electronic lock is simultaneously waiting on a valid credential, the electronic lock can also wait for an upload command from a remote device. The remote device can be another electronic lock, a remote PC or other computing device connected to the electronic lock, or a central server. At step 880, upon receipt of an upload command, the electronic lock uploads the inventory data stored at the electronic to the remote device. In such manner, inventory data stored at a plurality of electronic locks can be uploaded to a central location so that inventory data for a plurality of different enclosures can be managed and used from a central location.

According to yet another embodiment of the present disclosure, methodologies are provided for sending email, facsimile, SMS text or other suitable alerts to various users or other individuals when any of a variety of undesirable conditions are detected by the electronic access control system. According to this exemplary aspect of the present disclosure, a plurality of electronic locks 610 can be operatively connected to a central server 620 over network 630 as shown in FIG. 6. Each of the electronic locks 610 can include the capability to sense whether an undesirable condition, such as a low battery condition, a forced entry condition, a temperature out of range condition, or other undesirable condition has occurred for the particular electronic lock or the enclosure secured by the electronic lock. The electronic lock can then flag this condition and store the flagged condition in a database.

The next time electronic lock 610 communicates with server 620 over network 630, central server 620 can scan the electronic lock 610 for any flagged conditions. As will be understood by those of ordinary skill in the art from the complete disclosure herewith, if a flagged condition is detected, the central server can then be used (such as through a program or subroutine) to send an alert to a supervisor or other user, for instance, through email (for example, via the internet), facsimile, page, SMS text, or other suitable alert regarding the undesirable condition (all of which various alert forms of communication, such as internet, are representatively illustrated by the alarm output indicated in present FIG. 6). The supervisor or other user can then ensure that appropriate steps are taken to remedy the undesirable condition.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. An electronic access control system for use with an enclosure of the type having at least an exterior portion and a securable interior portion, comprising:
    a microprocessor based access control circuit;
    a lock configured to be unlocked by said access control circuit;
    memory, associated with said access control circuit, for storage of data associated with access control circuit activity and with contents of an associated enclosure; and
    a user interface configured to provide a user access to said access control circuit through input data verified by said microprocessor, wherein said access control circuit is configured to unlock said lock based on input data verified by said microprocessor, and wherein said user interface is further configured to provide a user access to said memory for selective input of preprogrammed codes reflecting either of removal or addition of enclosure contents for updating of data in said memory, for coded tracking of stored contents in an enclosure,
    whereby a user with verified input data can obtain both access control circuit activity data and updated stored contents data from said memory for a given associated enclosure.

2. An electronic access control system as in claim 1, wherein:
    said system further including a communications module for uploading of inventory data to a central server over a network.

3. An electronic access control system as in claim 2, further including a plurality of said systems respectively associated with a plurality of securable enclosures, each of which communicates with a central server over an associated network, for uploading of inventory data to such central server, and for downloading operational data to each microprocessor based access control circuit.

4. An electronic access control system as in claim 3, wherein selected of said systems comprise master level systems which are associated with a plurality of other systems comprising slave level systems thereunder, with said communications modules respectively communicating operational data to each slaved microprocessor based access control system from its associated master level system.

5. An electronic access control system as in claim 1, further including a battery-operated power supply for supplying power to said system.

6. An electronic access control system as in claim 5, wherein said battery-operated power supply comprises a self-contained battery pack removably connected to said control circuit, to facilitate changing of at least one of said battery and said battery pack technology.

7. An electronic access control system as in claim 1, further including:
    a plurality of said systems respectively associated with a plurality of securable enclosures; and
    a plurality of communications modules respectively associated with each such system and communicating over a network including connections which are one of hardwired and wireless including one of RF interface and 802.11 WiFi wireless network;
    wherein selected of said systems comprise master level systems which are associated with a plurality of other systems comprising slave level systems thereunder, with said communications modules respectively communicating operational data to each slaved microprocessor based access control system from its associated master level system.

8. An electronic access control system as in claim 1, further including:
    a motion sensor associated with said access control circuit and its associated securable enclosure, for sensing movement of such securable enclosure; and
    wherein said user interface is further configured to override such user access to said access control circuit and to lock said lock whenever said motion sensor senses movement of such securable enclosure, whereby contents of the associated securable enclosure are safeguarded during any movement of such securable enclosure.

9. An electronic access control system as in claim 1, further including:
    a plurality of said systems respectively associated with a plurality of securable enclosures;
    a plurality of communications modules respectively associated with each such system; and
    a plurality of motion sensors respectively associated with each said access control circuit and its associated securable enclosure, for sensing movement of such securable enclosure; and
    wherein selected of said systems comprise master level systems which are associated with a plurality of other systems comprising slave level systems thereunder, with said communications modules respectively communicating operational data to each slaved microprocessor based access control system from its associated aster level system;
    each said user interface is further configured to override such user access to said access control circuit and to lock said lock whenever its associated motion sensor senses movement of its associated securable enclosure, whereby contents of each associated securable enclosure are safeguarded during any movement of such securable enclosures; and said communications module s are each further configured for communicating with a central server over an associated network, for uploading of inventory data to such central server.

10. An electronic access control system for use with a securable enclosure of the type having at least an exterior portion and a securable interior portion, comprising:
a microprocessor based access control circuit associated with a given securable enclosure;
a lock configured to be unlocked by said access control circuit, to selectively provide access to the associated securable enclosure;
an alert means associated with said access control circuit and its associated securable enclosure, for sensing a condition relative to such securable enclosure; and
a user interface configured to provide a user access to said access control circuit through input data verified by said microprocessor, wherein said access control circuit is configured to unlock said lock based on input data verified by said microprocessor, and wherein said user interface is further configured to output data to such user whenever said alert means senses a condition relative to such securable enclosure;
wherein said alert means comprises a motion sensor associated with said access control circuit and its associated securable enclosure, for sensing movement of such securable enclosure; and
said user interface is further configured to override user access to said access control circuit and to lock said lock whenever said motion sensor senses movement of such securable enclosure, whereby contents of the associated securable enclosure are safeguarded during any movement of such securable enclosure.

11. An electronic access control system as in claim 10, further including a plurality of said systems respectively associated with a plurality of securable enclosures, each of which communicates with a central server over an associated network, for uploading of data to such central server regarding alert means sensing of conditions.

12. An electronic access control system for use with a plurality of securable enclosures and a central control server, comprising:
a plurality of microprocessor based access control circuits;
a plurality of locks, configured to be respectively and controllably unlocked by said plurality of access control circuits;
memory, associated with each associated enclosure, for storage of data associated with contents thereof;
user interface means configured to provide a user respective access to each of said access control circuits through input data verified by said microprocessors thereof, wherein said access control circuit is configured to unlock its respective lock based on input data verified by said microprocessor, and wherein said user interface means is further configured to provide a user access to an associated memory for selective updating of data in said memory regarding contents of the associated enclosure, whereby inventory management is provided relative to the associated enclosure;
a plurality of communication means, respectively associated with each of said access control circuits, for communication via an associated communications network between an associated central control server and each of said access control circuits, whereby access to an associated plurality of securable enclosures may be centrally controlled via electronically based communications from an associated central server; and
a self-contained battery pack with integral battery charger removably connected with at least one of plurality of microprocessor based access control circuits, to facilitate changing of such battery or the battery pack to a different size or technology without having to reconfigure the electronic access control system.

13. An electronic access control system as in claim 12, wherein said user interface means includes at least one of a keypad and a proximity card reader, and is further configured to be responsive to data provided by one of magnetic stripe cards, proximity cards, smart cards, RF fobs, IR fobs, iButtons, and biometric readers.

14. An electronic access control system as in claim 12, wherein said user interface means comprises a user readable display and a control panel configured to permit manual programming of operational parameters of an associated access control circuit by observation of said user readable display.

15. An electronic access control system as in claim 12, wherein said user interface means includes at least one of a keypad, an electronic card reader, a biometrics reader, a remote computer interface communicating via a network, and a master level device.

16. An electronic access control system as in claim 12, wherein said system comprises one of a retrofit and original equipment relative to an associated plurality of securable enclosures.

17. An electronic access control system as in claim 12, wherein an associated communications network includes connections which are one of hardwired and wireless, including one of RF interface and 802.11 WiFi wireless network.

18. Methodology for secured inventory management through use of an electronic access control system and a securable enclosure of the type having at least an exterior portion and a securable interior portion, comprising:
associating with a securable enclosure a lock configured to be unlocked by an access control circuit;
providing memory associated with the access control circuit for storage of data associated with access control circuit activity and with contents of the associated securable enclosure;
receiving and validating credentials from a user, in order to provide access by the user to contents of the associated securable enclosure by configuring the access control circuit to unlock the lock based on validated credentials from such user; and
after unlocking of the lock, prompting the user to provide memory updates for updated data on removal or addition of contents of the associated securable enclosure, whereby inventory management is provided such that whereby a user with validated credentials can obtain both access control activity data and updated contents data from said memory for a given associated enclosure.

19. Methodology as in claim 18, further including relocking the lock after the memory is updated with updated contents data.

20. Methodology as in claim 19, further including receiving an upload command, and thereafter forwarding updated data from such memory to a central location.

21. Methodology as in claim 18, further including providing a self-contained battery pack with integral battery charger removably connected with the electronic access control system, to facilitate changing of such battery or the battery pack to a different size or technology without having to reconfigure the electronic access control system.

* * * * *

UNITED STATES PATENT AND TRADEMARK OFFICE
CERTIFICATE OF CORRECTION

| | |
|---|---|
| PATENT NO. | : 8,742,889 B2 |
| APPLICATION NO. | : 12/888510 |
| DATED | : June 3, 2014 |
| INVENTOR(S) | : Kaczmarz et al. |

It is certified that error appears in the above-identified patent and that said Letters Patent is hereby corrected as shown below:

In the Claims

Column 22, line 27, Claim 7, insert --,-- after "wireless"

Column 22, line 62, Claim 9, insert --m-- before "aster"

Column 23, line 4, Claim 9, delete "said communications module s" and replace with --said communications modules--

Column 24, line 9, Claim 12, insert --said-- between the words "of" and "plurality"

Column 24, line 40, Claim 18, insert --,-- after the word "memory"; and
in line 41, insert --,-- after the word "circuit"

Signed and Sealed this
Twentieth Day of January, 2015

Michelle K. Lee
*Deputy Director of the United States Patent and Trademark Office*